United States Patent [19]

Joh et al.

[11] 4,284,594

[45] Aug. 18, 1981

[54] METHOD OF MANUFACTURING HOLLOW FIBER

[75] Inventors: Yasushi Joh; Akihiko Niina, both of Yokohama; Noriaki Kaneko, Kamakura; Toshio Sano, Yokohama; Noriyuki Ichige, Tokyo; Koji Ichikawa, Kawasaki; Akira Fukutome, Tokyo; Hisako Sonobe, Fujisawa, all of Japan

[73] Assignee: Nippon Zeon Co., Ltd., Tokyo, Japan

[21] Appl. No.: 102,537

[22] Filed: Dec. 11, 1979

[30] Foreign Application Priority Data

Dec. 20, 1978 [JP] Japan ................................ 53-158054

[51] Int. Cl.³ .............................................. B29D 27/00
[52] U.S. Cl. .................................. 264/41; 210/500.2; 264/177 F; 264/187; 264/209.1; 428/398
[58] Field of Search .................. 264/41, 177 F, 178 F, 264/187, 184, 209; 210/500 M; 428/398

[56] References Cited

U.S. PATENT DOCUMENTS

| | | | |
|---|---|---|---|
| 3,883,626 | 5/1975 | Kamide et al. | 264/41 |
| 4,127,625 | 11/1978 | Arisaka et al. | 264/28 |
| 4,171,987 | 10/1979 | Horiguchi et al. | 264/49 |

FOREIGN PATENT DOCUMENTS 54-15030 2/1979 Japan.
55-17130 5/1980 Japan.
55-20003 5/1980 Japan.

*Primary Examiner*—Jay H. Woo
*Attorney, Agent, or Firm*—Armstrong, Nikaido, Marmelstein & Kubovcik

[57] ABSTRACT

A method of manufacturing a hollow fiber in which a spinning solution of cellulose ester dissolved into an organic solvent is extruded from an annular slit, and simultaneously a core liquid is introduced into the inside hollow portion of the extruded spinning solution, the core liquid being selected from the group of hydroxycarboxylic acid, derivative of hydroxycarboxylic acid, monoterpene or these mixture, or consisting of a solution of the above-described compound or mixture.

9 Claims, No Drawings

METHOD OF MANUFACTURING HOLLOW FIBER

BACKGROUND OF THE INVENTION

1. Field of the Invention

This invention relates to a method of manufacturing a hollow fiber, and more particularly to a method of manufacturing a hollow fiber in which a spinning solution of cellulose ester dissolved in an organic solvent is extruded from an annular slit, while simultaneously introducing a core liquid into the inside hollow portion of the extruded spinning solution.

A hollow fiber made of cellulose ester, particularly cellulose acetate or of cellulose as hydrolyzate of cellulose ester is widely used as a membrane having superior selective permeabilities. Required performances of hollow fibers for separation of substances differs variously according to their intended use. For example, in the case that hollow fibers are used for reverse-osmosis e.g., desalination of sea water, the hollow fibers should have high water-flux as well as high rejection against salt. In hemo-dialysis for a patient suffering from renal failure, metabolic wastes such as urea, uric acid and creatinine should be easily and selectively removed from his blood through the hollow fiber membrance, and simultaneously a well-balanced ultrafiltration property or dewatering property is additionally required. To meet the above requirements, different spinning conditions must be selectively applied to produce the hollow fiber, considering the object and required performances. Various studies have been made to determine appropriate spinning conditions.

When spinning a hollow fiber having a continuously extending hollow portion over its whole length, a spinning solution (dope) is generally extruded from an annular slit to form a sheath solution, and simultaneously a core liquid is introduced into the inside hollow portion of the sheath solution. The core liquids known so far can be classified into two categories.

The first is a liquid having no compatibility with the sheath solution, for example, when a cuprammonium solution of cellulose is extruded as the sheath solution an organic solvent having no compatibility with water is extruded as the core liquid. However, this method has a big disadvantage in that it requires much labor and time to wash the core liquid from the manufactured hollow fiber and the removal of the core liquid is always imperfect due to the incompatibility of the core liquid with water.

The second category is that water or an aqueous solution is used as the core liquid. In this case, interdiffusion between the sheath liquid and the core liquid occurs rapidly. This develops an instantaneous gelation of the sheath solution by the action of a strong coagulating function of water immediately after the extrusion from the annular slit. This phenomenon can be observed even in a dry jet-wet spinning of the hollow fiber. As the result, the spinnability is very poor and the draft ratio is also very small, as shown by the low value of the highest linear speed of the spun filament. That is, the spinning speed is very low, i.e., at most 6 to 15 m/min. The structure of a hollow fiber formed by the rapid coagulation shows considerable effect on a water-flux of the resulting membrane. Such membrane is useful in a sense for ultrafiltration, but it can not be used for the hemo-dialysis because the water-flux is too high, essential ingredients in the blood such as albumin (nutriment source), which have comparatively high molecular weights are undesirably removed, and dewatering performance and waste removability are not well-balanced.

Accordingly, in the conventional method of manufacturing a hollow fiber useful for the hemo-dialysis, a core liquid which is incompatible with the sheath dope showing phase separation has been generally used.

A hollow fiber made of cellulose acetate or regenerated cellulose therefrom has been on the market. So far, the cellulose acetate hollow fiber is manufactured by so-called "semi-melt spinning" or "plasticized melt spinning" in which a plasticizer such as triethylene glycol, triacetin or sulfolane is mixed with cellulose acetate without using a solvent and the mixture is melted and extruded to prepare the sheath part of the hollow fiber. Thus, the polymer melt is extruded to form a hollow fiber in the same way as in melt spinning. Sequently the plasticizer contained in the fiber membrane is removed to give a porous structure thereto. However, this technique allows only a small degree of freedom to impart various porosities. Hence the semi-permeability of the hollow fiber can not be optionally adjusted.

One may have the idea that wet spinning might be applied for the production of cellulose acetate hollow fibers, for example, an acetone solution of cellulose acetate as the sheath dope can be spun in the wet process. In this process advantageously, a coagulating condition of the dope might be variously controlled. Therefore, it might be expected that a hollow fiber having a controlled porosity would be manufactured. Actually, this wet spinning is not suited for the manufacture of hollow fibers for hemodialysis owing to extraordinary solubility characteristics of acetone. Acetone has an excellent capability of dissolving many kinds of solvents, ranging from non-polar substances to polar substances. for Example, it can dissolve, petroleum, hexane, benzene and toluene a well as polar substances such as water and alcohol. Therefore, acetone is compatible with almost all organic and inorganic solvents. When acetone is the solvent component of the spinning solution and an organic solvent is used as a core liquid, the core liquid is compatible with a spinning sheath solution. In this case, the core liquid, which usually has a coagulating function for the spinning solution shows an undesirable ability to coagulate the sheath dope. In more detail, the spinning solution extruded from a nozzle immediately contacts the core liquid, and the core liquid diffuses into the spinning solution to gelate or coagulate the sheath dope because of the easy-miscible property of the acetone component of said dope. Hence, the spinning speed cannot be raised because of the rapid gelation of the spinning solution and a desired hollow fiber for the hemo-dialysis can not be obtained.

SUMMARY OF THE INVENTION

Accordingly, it is an object of the present invention to provide a method of manufacturing a hollow fiber at high speed while using a specific core liquid.

Another object of the present invention is to provide a method of manufacturing a hollow fiber with an excellent stability.

A further object of the present invention is to provide a method of manufacturing a hollow fiber having a superior dialysis property and being adaptable to many uses.

In accordance with one aspect of the present invention, a method of manufacturing a hollow fiber in which a spinning solution of cellulose ester dissolved in an organic solvent is extruded, preferably in the substantially perpendicular direction, from an annular slit of an orifice and a core liquid is simultaneously introduced into the inside hollow portion of the extruded spinning solution, the improvement comprises the step of using the core liquid selected from the group of hydroxycarboxylic acid, derivative of hydroxycarboxylic acid, monoterpene or mixture thereof, or consisting of a solution of the above-described compounds or mixtures. The present invention can be carried out particularly in dry jet-wet spinning or wet spinning.

Various other objects, advantages and features of the present invention will be readily apparent from the below-detailed description, and the novel features will be particularly pointed out in the appended claims.

DESCRIPTION OF THE PREFERRED EMBODIMENTS

According to one preferred embodiment of the present invention, hydroxycarboxylic acid or its derivative as a core liquid is an organic compound represented by the following general formula:

where R is an aliphatic hydrocarbon group, X is a hydroxyl group, and Y is a carboxyl group or an ester thereof. Typical examples of this organic compound are glycolic acid, lactic acid, $\alpha$-oxy-n-butylic acid, $\alpha$-oxyisobutylic acid, and these methyl esters, ethyl esters, phenyl esters, benzyl esters and the like.

These organic compounds alone may be used as the core liquid, or may be mixed with other compatible solvents such as water or organic solvents to prepare the core liquid. In using the mixture, it is preferable that the core liquid does not contain more than 80 percent by weight of water. Because when the core liquid contains more water, a coagulating or gelating function of water is notably developed so that a hollow fiber filament may be gelated immediately after the extrusion of a spinning solution from the slit to deteriorate the spinnability. Examples of organic solvents compatible with the afore-said hydroxycarboxylic acid or its ester are methanol, ethanol, acetone, glycerin, $\alpha$-pyrrolidone and so on. The concentration of hydroxycarboxylic acid or its ester in the core liquid may be more than 10 percent by weight, and is preferably more than 20 percent by weight, more preferably more than 50 percent by weight.

Here, it should be noted that the hydroxycarboxylic acid or its ester used in the core liquid is a solvent or swelling agent for cellulose ester in the spinning solution. As mentioned previously, the conventional core liquid, which has been used so far, consists of an incompatible and, therefore, in another sense, a non-coagulant liquid extruded phase- along the spinning solution, or of a liquid such as water having a great gelating effect on the spinning solution. This known method cannot anticipate the feature of the present invention wherein the core liquid comprises a solvent or swelling agent for a polymer dissolved in the spinning solution and therefore is compatible or easily mixed with the spinning solution. In other words, in the known method, it has been a matter of common-sense that such solvent or swelling agent, if used as the core liquid, is liable to mix with the extruded sheath dope due to the interdiffusion therebetween whereby manufacturing the hollow fiber itself becomes impossible. However, according to the present invention, the filament extruded downward substantially in the perpendicular direction shows a superior thread-forming property and a hollow fiber having a uniform quality and a true-circular cross-section can be spun particularly in the dry wet-jet spinning process, in spite of the fact that the core liquid comprises the solvent or swelling agent of cellulose ester, which is, of course, compatible with the spinning solution. This out-standing method will be explained below in detail.

In the present invention, the extruded sheath dope is led from the orifice through a gaseous space having a predetermined length, preferably of at least 5 cm, and then introduced into a coagulating bath consisting of water or water-containing solution in which the amount of water is more than 30 percent by weight. Sequently the formed filament is preferably washed with water. The spinning solution extruded from the annular slit is highly viscous (for example, 200 to 2000 poises) because it is a polymer solution. The dry jet-wet spinning is carried out downward, substantially in the perpendicular direction. Although the core and the sheath liquids are compatible with each other, each has an inertia to flow down naturally in the vertical direction under condition wherein no strong external agitation is imposed. Thus, the core liquid can not be easily mixed with the spinning solution of high viscosity during a short time of its running through the gaseous gap before introduced into the coagulating bath. Especially in the dry jet-wet spinning process, the dwell time of the running filament through the gaseous gap before the coagulating bath is at most 0.01 sec to 5.0 sec. During such short time, the core liquid flowing vertically with the natural inertia can not be mixed with the viscous spinning solution. Accordingly, the spun dope involving the core liquid is introduced into the coagulating bath substantially in the same geometrical mode that it was extruded from the orifice.

Thus, the spun dope can be coagulated in the bath maintaining its true-circular cross-section when introduced into the coagulating bath. Besides, the core liquid has essentially no, or at most very little, effect on the gelation of the sheath dope, and the thread-forming property is highly improved. When the spun dope is introduced into the coagulating bath, gelation first occurs from outside and the running direction of the gelled filament is then changed with a direction-converting guide rod, and the coagulated filament is led to the subsequent washing process. In the case that the coagulation or gelation is insufficient and hence mechanical strength of the running filament is not enough, said filament is liable to be broken, for example, at a direction-converting guide rod. Consequently, the spinning operation can not be successfully carried out as a whole. For this reason, the spun dope should be rapidly gelled in the coagulating bath. From this point of view, the inventors of the present invention have found that water is the best coagulant. The coagulating bath may consist of a mixture containing predominant amount of water. A mixture of water and the organic solvent used in the spinning solution may be used. In this case, the amount of water in the coagulating bath should be at least 30 percent by weight. When the amount of water is lower than 30%, the filament is often broken at the converting guide rod because of insufficient coagulation of the filament. When the above-described coagulating bath is used, the coagulation starts by the action of the coagulant, for example, by water immediately after the spun dope filament is introduced into the coagulating bath. During this coagulating process, the coagulant such as water rapidly penetrates into the hollow fiber membrane from outside to form a gelled structure having a desired permeability. The coagulant subsequently penetrates through the gelled structure toward the hollow portion of the filament to dilute the core liquid filled therein. Thus, the core liquid is successively substituted by water, rapidly reducing the solubility for cellulose ester of the filament.

According to the present invention the gelation of the spinning solution by the core liquid does not develop as the spun dope filament passes through the gaseous space. As the result, the spinning solution can be stably spun, and a well-balanced hollow fiber can be manufactured. To obtain a uniform hollow fiber the dry-passage between the orifice and the coagulating bath is normally at least 5 cm in length, preferably 5 to 100 cm, more preferably 10 to 50 cm, and very preferably 10 to 35 cm.

The present invention may be applied to the wet spinning process in which the spinning solution is directly extruded into the coagulating bath through the orifice immersed therein. The extruded spinning solution is immediately gelled from its outside in the coagulating bath to form a gelled structure. The core liquid is subsequently diluted by the coagulant penetrating through the filament membrane from the coagulating bath to lose the solubility for cellulose ester, thereby a desired hollow fiber can be manufactured. However, in the wet spinning, the spun sheath dope is inevitably gelled from the outside immediately after the extrusion of the spinning solution through the orifice, therefore, it is natural that it is hard to increase the spinning speed up to the same speed of the dry jet-wet spinning. However, when the present invention is applied to the wet spinning, an extraordinary dialysis performances can be imparted to the spun hollow fiber, which will be mentioned below.

Another importance of the present invention lies in the fact that monoterpene is also used as the core liquid. Such monoterpene can be acyclic monoterpene, monocyclic monoterpene or bicyclic monoterpene. Examples of the acyclic monoterpene are β-myrcene, ocimene, cryptotaenene and so on. Examples of the monocyclic monoterpene are limonene, d-limonene l-limonene, dipentene, isolimonene, terpinolenes, α-terpinene, γ-terpinene, β-terpinene, l-α-phellandrene, d-α-phellandrene, dl-α-phellandrene, β-phellandrene, 2,8(9)-p-menthadiene, d-sylvestrene, l-sylvestrene, dl-sylvestrene and so on. Examples of the bicyclic monoterpene are santene, $\Delta^3$-carene, d-$\Delta^3$-carene, l-$\Delta^3$-carene, d-sabinene, l-sabinene, α-thujene, β-thujene, l-β-pinene, l-α-fenchene, d-βfenchene, α-fenchene, cyclofenchene, orthodene, carane, trans-l-pinane and so on. Among these monoterpenes, especially limonene is suitable as the core liquid. Monoterpene may be of dl-, l- or d-modification type.

The inventors of the present invention have found that when monoterpene, for example, limonene is used as the core liquid, the spinning is stably effected up to a remarkable high speed. The maximum spinning speed exceeds 180 m/sec. and the hollow fiber can be stably spun at a speed of over 150 m/sec. In addition to this, according to the present invention, the big advantage lies in the fact that after the coagulation in the coagulating bath the hollow fiber involving limonene in its hollow portion can be subjected to subsequent treatments. Such subsequent treatments are washing with water, hydrolysis (complete or partial hydrolysis), neutralization, washing with water, plasticization with glycerin and so on. Because limonene involved in the hollow portion of the spun filament is incompatible with water and has a high boiling point of 176° C., it has no tendency of diffusing or dispersing toward the outside of the filament through the membrane during the above-mentioned processes. Accordingly, limonene is always kept in the hollow portion of the filament. For this reason, all of the above subsequent treatments can be effected with the limonene in the hollow portion. Thus, the true-circular cross-section of the filament is not deformed, for example, by the guide rod during the subsequent treatments in spite of the strain at the guide rods. In addition, the filament with limonene contained therein can be chemically treated and dried because of the high boiling point of limonene. If, on the other hand, the core liquid consists of the material of a low boiling point such as water, such low boiling material tends to vaporize in a drying process. As the result, the hollow portion of such filament is often deformed or flatten. The inventors of the present invention have found that when a d-monoterpene like limonene is used as the core liquid, a hollow fiber having a superior dialysis performance can be readily spun. The reason for this successful result is considered as follows:

1. Because limonene has a properly high molecular weight (136.23), it diffuses very slowly into the spun sheath dope.

2. Limonene is one of monoterpenes having quite a different chemical structure from the solvent such as acetone. Besides, limonene is a hydrocarbon with unsaturated bonds and has a lower diffusion speed into the solution of cellulose ester than conventional lower molecular weight organic compound.

3. Because limonene has a proper viscosity, the diffusion of the core liquid into the sheath dope is suitably controlled.

4. Limonene has a special feature to show phase separation with organic solvent involving polar substance. For example, limonen can be miscible with acetone, but it can not be miscible with acetone-formamide mixture, developing phase separation.

These phenomena 1 to 3 are considered to multiply by each other so as to bring about good results. This means that the method of the present invention is based upon a peculiar combination of monoterpene such as limonene (core liquid) and the sheath dope comprising the solution of cellulose ester dissolved in the organic solvent α-pyrrolidone, N-methyl pyrrolidone, acetone, dimethyl sulfoxide, dimethyl formamide. The core liquid does not necessarily consist of limonene alone, because a limonene solution can be used as the core liquid. The concentration of limonene in the solution is preferably more than 20 percent by weight. In this case, an organic solvent compatible with limonene is generally used as another ingredient of the solution. It is desired that the organic solvent compatible with limonene is miscible with ethanol, because it must be removed by washing before the final product (hollow fiber) is obtained in view of non-toxicity. Examples of the miscible organic solvent with limonen are isopropyl alcohol, octyl alcohol, ethanol, butanol, methanol, glycerine, acetic acid, butylic acid, benzene, toluene, N-methyl pyrrolidone, 2-pyrrolidone and so on. Limonene is obtained in general by purifying orange oil, lemon oil or the like, however, limonene-containing raw oil such as orange oil, lemon oil or the like can be also used as the core liquid. Among these oils, orange oil is of d-type and contains d-linalool, citral, n-decylaldehyde and so on. Such orange oil may be used without any purifications.

The core liquid of the present invention comprises one of hydroxycarboxylic acid or its ester and limonene. These compounds are different from each other in function. However, they may be jointly used as a mixture. When the above mixture is used as the core liquid, interdiffusion between the core liquid and the sheath dope is appropriately controlled so that a degree of gelation of cellulose ester dope can be adjusted.

Examples of cellulose ester contained in the spinning solution according to the present invention are cellulose acetate, cellulose butyrate, cellulose propionate, cellulose acetate butyrate, cellulose acetate propionate and so on. In the below description cellulose acetate will be mainly described as cellulose ester.

When cellulose acetate is applied to the present invention, a degree of the esterification, represented by combined acetic acid content is normally 50 to 65 percent by weight. The organic solvent for cellulose ester to prepare the dope can be optionally selected among solvents compatible with the coagulant of the coagulating bath. The organic solvents for cellulose acetate can be acetone, nitromethane, methyl cellosolve acetate, dioxane, tetrahydrofuran, ethyl formamide, methyl formate, propylene oxide, methyl formamide, dimethyl formamide, methylene chloride-methanol (9:1), ethylene dichloride-ethanol (9:1), dimethyl sulfoxide and α-pyrrolidone so on. The concentration of cellulose ester in the spinning solution depends on the molecular weight of cellulose ester. It normally ranges from 10 to 35 percent, and preferably from 15 to 30 percent by weight.

Another material may be added to the spinning solution in order to impart desirable selective permeability to the resultant hollow fibers taking into account of their uses. A swelling agent for cellulose ester is known as an effective additive. The additive may be an organic swelling agent such as dimethyl sulfoxide, N, N-dimethyl formamide, formamide, urea, triethyl phosphate, glyoxal, N-methyl-2-pyrrolidone, t-butanol, isopropanol, sulfolane, triethyleneglycol or the like. The additive may also consist of an inorganic swelling agent such as hydrogen peroxide, perchloric acid, salt of perchloric acid, for example, lithium perchlorate, sodium perchlorate, calcium perchlorate, aluminum perchlorate, lanthanum perchlorate, iron perchlorate and ammonium perchlorate, and inorganic chloride, for example, zinc chloride, zinc iodide, zinc bromide, cadmium bromide, cadmium iodide, hydrogen iodide, sodium iodide, potassium iodide, magnesium iodide, aluminium iodide and calcium chloride. The kind and the amount of the above-described additive can be selected depending upon the required performance of the hollow fiber. Two or more kinds of the additives may be used as occasion demands. Because the amount of the additive differs depending on the kind of the solvent in the spinning solution, the concentration of cellulose ester therein and the required performance of the hollow fiber, it can not be generally determined. However, the amount of the organic additive may be normally in the range of 5 to 65 percent by weight based on the total amount of the spinning solution. The suitable amount of the inorganic additive is varied depending on the case. It can be used alone or together with other material. For example, in the form of an aqueous saturated solution of the inorganic additive is added to the spinning solution. Normally, the amount of the inorganic additive ranges from 1.0 to 30 percent based on the total spinning solution. Both the organic and inorganic additives can be jointly added to the spinning solution. Nonsolvent such as water, ethanol and methanol may be added to the spinning solution within the range in which cellulose ester can be dissolved into the solvent.

According to the finding of the inventors based on the detailed studies on the dialysis performance of the hollow fiber and the effect of the above additives, the effect of the additive in the manufacturing the hollow fiber is not always identical with that in a conventional manufacturing of a film cast from the dope. That is, the method of the present invention essentially differs from the conventional method. The dry jet-wet spinning applied to the present invention the spinning solution is extruded from the orifice, and the resulting dope filament is introduced into the coagulating bath after being passed through the gaseous space in a very short time such as 0.01 to 5.0 second. According to the present invention the coagulation behavior of the hollow filament involving the core solution is quite different from that in the case of the film cast on a glass plate, because of the complicated function of the core liquid for the coagulation of the hollow fiber.

As described above in detail, the method of the present invention is new and superior to the conventional method in that the produced hollow fiber has a good selective permeability and it can be stably spun with uniformity at a high speed.

According to the present invention, water or an aqueous solution with water as a major component is preferably used for the coagulating bath as already described. The aqueous solution may be a mixture of water and the solvent used in the spinning solution, that is, an acetone solution having a concentration of 5 to 50 percent of acetone may be used. The aqueous solution may be a mixture of water and the component of the core liquid, or a mixture of water, the component of the core liquid and the solvent of the spinning solution. In the dry jet-wet spinning, it is preferable that the coagulating bath has a water content of more than 30 percent by weight. In the wet spinning, the content of water in the coagulating bath is sometimes less than 30 percent by weight in consideration of the spinnability of the hollow fiber. The temperature of the coagulating bath is preferably 0° to 50° C., more preferably 0° to 30° C. Normally, the hollow fiber coagulated in the coagulating bath is subsequently subjected to a water-washing process where the coagulation is usually complete.

The hollow fiber of cellulose ester manufactured by the afore-said method may be hydrolyzed, for example, with sodium hydroxide to obtain a hollow fiber of regenerated cellulose.

Next, the present invention will be explained in more detail in accordance with the following examples in which cellulose acetate is mainly used as the polymer of the spinning solution. Of course, the present invention is not limited to the examples and can be variously modified within the scope of the claims. The following Comparative Examples and Examples are set forth to assist in understanding of the features of the present invention.

COMPARATIVE EXAMPLE 1

23 parts of cellulose acetate (E-400-25: Eastman Kodak Co.) were dissolved in 77 parts of acetone to prepare a spinning solution. The spinning solution was extruded downward from an annular orifice into a gaseous space substantially in the vertical direction. Simultaneously, water was ejected from an inner pipe concentrically positioned in the annular orifice into the hollow inside portion of the extruded spinning solution. Thus, a hollow fiber was spun in the conventional dry jet-wet spinning. The spun dope was run from the orifice through the gaseous space of 30 cm and then introduced into a water bath at 20° C., where it was coagulated. The coagulated dope filament was successively led through a washing water bath and then wound up on a take-up roll.

In this comparative example, the spun dope was gelled immediately after extrusion from the orifice. As the result, the thread-forming property was so poor that the filament was broken only by imposing a little draft thereon. Even if experimental conditions were varied, the maximum spinning speed was merely 10 m/min.

EXAMPLE 1

The spinning solution and the spinning apparatus were the same as those in Comparative Example 1 except that dl-lactic acid was used as the core liquid in place of water. Spinning temperature was 25° C.

In this example, a hollow fiber with excellent thread-forming properties was spun. The spinning was stably performed at a spinning speed of 120 m/min and the maximum spinning speed was 154 m/min. No breakage of the fiber was observed during a 10-hour spinning period. Also in this example, the spun dope was run through the a gaseous space of 30 cm and then introduced into a coagulant bath (a water bath) substantially immediately below the orifice, and coagulation was completed in a subsequent water bath. The coagulated filament was washed with water before being wound up on a roll. The hollow fiber after being wound on the roll had a uniform true-circular cross-section and an even wall thickness. In comparison with the spinning speed of at most 10 m/min in Comparative Example 1, the process of this example is superior particularly in view of the high spinning speed spinning.

EXAMPLE 2

A spinning experiment was carried out under the same conditions as those in Example 1 except that a mixture of lactic acid and water (90:10 in weight ratio) was used as the core liquid. As the result, the maximum spinning speed was 148 m/min. A uniform hollow fiber having an even wall thickness and a true-circular cross-section was obtained.

EXAMPLE 3

In this example, the weight ratio of lactic acid and water in the core liquid was changed to 10:90. Under this condition, a similar experiment to Example 2 was performed. It was observed that the gelling function of water was considerably developed. The same operation was performed under a condition that the weight ratio of lactic acid and water was 70:30. Under this ratio, a hollow fiber was sampled at a spinning speed of 60 m/min.

COMPARATIVE EXAMPLE 2

21 parts of cellulose acetate E-400-25 supplied from Eastman Kodak Co. was dissolved in 79 parts of acetone to prepare a spinning solution. Similarly to Comparative Example 1, the spinning solution was extruded from tube-in-orifice type spinneret to spin a hollow fiber with the same spinning apparatus. In this example, commercial ethanol was used as the core liquid and water was used as coagulating bath. The temperature of the coagulating bath was 5° C. The maximum spinning speed of 86 m/min was obtained, however, the spinnability was not so satisfactory. The breakage of the dope filament was often observed and the spinning speed had to be lowered than 40 m/min to produce sample fibers. Nevertheless, the spinning operation was by no means stable and the breakage of the filament occured at times.

EXAMPLE 4

Experimental conditions were the same as Comparative Example 2 except that a mixture of ethyl lactate and ethanol (70:30 in volume ratio) was used as the core liquid.

In this example, the maximum spinning speed came up to 171 m/min and a hollow fiber could be quite stably spun at a spinning speed of 120 m/min. The extruded spinning solution was run through a gaseous space of 35 cm in length and then coagulated in a water bath. The coagulated filament was further washed with water before being wound up on a take-up roll. Other experiments were carried out, in which the water in the coagulating bath was replaced by a mixed solvent of water and ethyl lactate. The ratio of water to ethyl lactate was variously changed. It was found that when the ratio of water to ethyl lactate is less than 30:70 in weight ratio, in other words the content of water does not exceed 30 percent by weight, the coagulation of the dope was insufficient, which resulted in the breakage of the filament at the place of converting the running direction on a direction-converting guide rod in the coagulating bath. The results is not satisfactory. However, when the content of water in the coagulating bath was more than 30 percent by weight, trouble caused by breakage of the filament was overcome. Further, the continuous spinning operation was performed for 10 hours while using a water bath as the coagulating bath, no breakage of the filament occurred and the manufactured hollow fiber had an even and approximately true-circular cross-section and a uniform wall thickness.

EXAMPLE 5

A hollow fiber of cellulose acetate was spun using conditions which were the same as in Example 4 except that a mixture of ethyl lactate and ethanol (10:90 in volume ratio) was used as the core liquid and the coagulating bath consisted of water. The maximum spinning speed was 181 m/min. The hollow fiber could be stably spun at a spinning speed of 120 m/min and showed no breakage during a spinning run of 4 hours.

COMPARATIVE EXAMPLE 3

Cellulose acetate (E-400-25 from Eastman Kodak Co.) was dissolved in a mixture of acetone and formamide (40:60 in volume ratio) to prepare a 23% spinning solution. The same spinning apparatus as in Comparative Example 1 was used in this example. Water was extruded as the core liquid, and water bath was used as the coagulating bath. The maximum spinning speed was 9 m/min, that is, when the spinning speed was in excess of 9 m/min, the breakage of the spun dope took place immediately below the spinning orifice. The thread-forming property was so unsatisfactory that the filament could not be drafted to higher ratio.

EXAMPLE 6

The spinning solution was the same as in Comparative Example 3 while the spinning apparatus had the same construction as in Comparative Example 1. In this example, ethyl lactate was used as the core liquid. The extruded spinning solution from the annular slit of the orifice was led downward through a gaseous space of 20 cm substantially in the vertical direction and then coagulated in the water bath. The coagulated filament was subsequently introduced into a water-washing bath and then wound up on a take-up reel.

According to this example, the spinnability was surprisingly improved in comparison with the afore-said Comparative Examples. The maximum spinning speed of 163 m/min was obtained. When the filament was sampled at a speed of 120 m/min, a stable spinning was effected without any breakage of the filament. The manufactured hollow fiber had a true-circular cross-section and a uniform wall thickness.

COMPARATIVE EXAMPLE 4

The spinning was carried out by the use of methanol as the core liquid as in Example 5. The maximum spinning speed was 41 m/min. When the speed was in excess of that value, troublesome breakage of the filament occurred. Also when the filament was sampled at a speed of 20 m/min, the breakage of the filament was often observed.

EXAMPLE 7

The spinning conditions were the same as in Comparative Example 4 except that a mixture of glycolic acid and methanol (40:60 in volume ratio) was used as the core liquid and the dry passage through a gaseous space was 20 cm in length. In this example, a hollow fiber was stably spun at the speed of 100 m/min without any breakage. The hollow fiber manufactured had a true-circular cross-section and a uniform wall thickness.

EXAMPLE 8

A spinning solution was prepared from the same cellulose acetate (supplied by Eastman Kodak Co.) as used in Comparative Example 1. The spinning solution was composed of 69 parts of acetone, 23 parts of cellulose acetate, 6.1 parts of water, 1.6 parts of magnesium perchlorate and 0.3 part of hydrochloric acid. The tube-in-orifice type nozzle used for spinning was similar to the one used in Comparative Example 1. In this example, a mixture of ethyl lactate and glycerine (90:10, volume ratio) was used as the core liquid. The extruded spinning solution was run downward through a gaseous space of 18 cm substantially in the perpendicular direction and then coagulated in an aqueous coagulating bath containing 20% lactic acid. The coagulated filament was then introduced into a water bath to complete the coagulation and further led through the water-washing process before being wound up on the take-up roll.

A uniform hollow fiber having a true-circular cross-section was stably manufactured at a spinning speed of 120 m/min. However, when the core liquid was composed of a mixture of water and glycerine (90:10 in volume ratio), the spinnability was remarkably deteriorated so that an appreciable thread-forming property was no longer shown and the filament could not be subjedted to draft operation. The sampling of the filament could be performed only at a spinning speed of at most 10 m/min.

EXAMPLE 9

21 parts of cellulose acetate (Eastman Kodak Co.) used in Comparative Example 1 were dissolved in 71 parts of acetone containing 8 parts of polyethylene glycol (molecular weight: 400) to prepare a spinning solution. The spinning solution was extruded while lactic acid as the core liquid was ejected into the inside hollow portion of the extruded spinning solution. This example was performed using wet spinning in which the annular slit was immersed into a coagulating bath consisting of a mixture of water and lactic acid (45:55 in volume ratio). The spinnability was so satisfactory that the hollow fiber was stably spun at a speed of 23 m/min. This speed is very high for wet-spinning. In comparison when, a hollow fiber was spun using a core liquid consisting of water, a mixed solvent of water and lactic acid (80:20 in volume ratio), ethanol, or methanol. The spinning speed was, in each instance, less than 15 m/min, and stable spinning at a speed above 6 m/min was impossible.

REFERENCE EXAMPLE 1

Respective hollow fibers manufactured in Comparative Example 1 and Examples 1, 2, 4, 6 and 7 were hydrolyzed with a 1% aqueous sodium hydroxide solution to prepare hollow fibers of regenerated cellulose. Each dialysis property of the regenerated hollow fibers was measured. In every cases, a cylindrical dialyzer of an artificial kidney type was assembled by the use of the regenerated hollow fibers in such a way that the total effective area of the membranes was set at 1.3 m$^2$. A solution containing urea and vitamin B$_{12}$ was led through the hollow portion of the fibers at a rate of 200 ml/min, while distilled water was counter-currently passed through the exterior of the fibers at a rate of 500 ml/min. Under this condition, the dialysances of urea and vitamin B$_{12}$ and the ultrafiltration rate (UFR) at 37° C. were respectively measured. The results obtained are shown in Table I.

TABLE I

| Hollow fiber of regenerated cellulose | Dialysance (ml/min) | | UFR (ml/m$^2$ · hr · mmHg) |
|---|---|---|---|
| | Urea | Vitamin B$_{12}$ | |
| Obtained from | | | |
| Example 1 | 168 | 41 | 3.8 |
| Example 2 | 162 | 43 | 4.0 |
| Example 4 | 167 | 44 | 4.1 |
| Example 6 | 182 | 58 | 5.6 |
| Example 7 | 179 | 62 | 6.3 |

EXAMPLE 10

The spinning solution and the spinning apparatus were the same as in Comparative Example 3. d-Limonene (99%) was used as core liquid in place of water. The spinnability of the hollow fiber was excellent. The maximum spinning speed was 186 m/min and the spinning was very stable at 130 m/min. No breakage of the filament was observed during the spinning of 10 hours. In this example, the extruded spinning solution was run through the air gap of 30 cm and then coagulated in the coagulating water bath at 20° C. positioned immediately below the orifice. The coagulated filament was successively introduced into the water bath to complete the coagulation and then wound up on the roll. After being wound up, the hollow fiber showed a true-circular cross-section and a uniform wall thickness.

EXAMPLE 11

The spinning conditions were the same as in Example 10 except that orange oil (90 percent d-limonene) was used as the core liquid. The stable spinning speed was at 120 m/min. The manufactured hollow fiber was, uniform in the wall thickness and had a true-circular cross-section.

EXAMPLE 12

In the similar spinning conditions to Comparative Example 2, a mixture of orange oil and ethanol (60:40 in volume ratio) was used as core liquid. In this example, the maximum spinning speed reached 142 m/min and the spinning was carried out stably at 120 m/min. The extruded spinning solution was led through the gaseous gap of 30 cm in length and then introduced into the water bath to coagulate. The coagulated filament was subsequently washed with water and then wound up on the take-up reel. Other experiments were carried out using a water-acetone mixtures for the coagulating bath. The ratio of water to acetone was variously changed. When the ratio is less than 40:60 in weight ratio, the coagulation of the dope became insufficient and the breakage of the filament on the direction-converting guide rod was sometimes observed. However, when the content of water in the coagulating bath was more than 50 percent by weight, there was no serious problem in the coagulation. When a water bath was used as the coagulating bath, the spinning was stably performed for 10 hours, and no breakage of filament was developed during the spinning. The produced hollow fiber showed an approximately true-circular cross-section and a uniform wall thickness.

EXAMPLE 13

The spinning solution and the spinning apparatus were the same as in Comparative Examples 3. d-Limonene was used as core liquid. The extruded sheath dope was run downward through an air gap of 18 cm substantially in the vertical direction and then coagulated in the water bath at 40° C. The coagulated dope was subsequently led into a second water bath before being wound up on the take-up reel. In this example, the spinnability was unexpectedly improved compared with that in Comparative Example 3 and a maximum spinning speed of 152 m/min was obtained. During the spinning of the hollow fiber, no breakage was observed, thereby showing satisfactory spinnability. The cross-section of the spun hollow fiber was true-circular with a uniform wall thickness. When a mixture of d-limonene and octyl alcohol (70:30 in volume ratio) was used as the core liquid, substantially similar results were obtained.

EXAMPLE 14

A cellulose acetate hollow fiber was spun under the same conditions as in Comparative Example 2 except that a mixture of d-limonene and ethanol (90:10 in volume ratio) was used as core liquid and the dry passage of the gaseous space was 35 cm in length. The hollow fiber could be stably spun at a spinning speed of 120 m/min without any breakage. It had a true-circular cross-section as well as a beautifully even wall thickness.

EXAMPLE 15

A cellulose acetate spinning solution was prepared as in Comparative Example 1. The spinning solution was composed of 69 parts of acetone, 23 parts of cellulose acetate, 1.6 parts of magnesium perchlorate and 0.3 part of hydrochloric acid. Similar to Comparative Example 1, a hollow fiber was spun with a tube-in-orifice type spinneret. A mixture of d-limonene and glycerine (80:20 in volume ratio) was used as core liquid. The extruded sheath dope was run through the gaseous gap of 30 cm substantially in the vertical direction and then introduced into the aqueous coagulating bath containing 10 percent of acetone. The coagulated filament was successively introduced into the water bath to complete the coagulation, it was led through the water-washing process and then wound up on the take-up roll. In this example, a hollow fiber having a uniform true-circular cross-section was stably spun at a speed of 130 m/min. On the other hand, when the core liquid consisted of a mixture of water and glycerine (90:10 in volume ratio) was used, the spinnability was extremely deteriorated and thread-forming property was lost so that the draft operation was actually impossible. The sampling of the hollow fiber was performed only at a spinning speed of at most 12 m/min.

EXAMPLE 16

The spinning solution, the spinning apparatus and the spinning operation were the same as in Example 13. The coagulated filament from the coagulating bath was passed through the water bath. Subsequently, the filament was hydrolyzed at 20° C. for 10 minutes in a 1% aqueous solution of sodium hydroxide, and then subjected to washing with water and the filament was then plasticized with glycerine before being wound up on a reel. The cellulose hollow fiber thus obtained had a uniform inner diameter of 242$\mu$.

EXAMPLE 17

The cellulose acetate hollow fiber produced by using the mixture of d-limonene and glycerine as core liquid in Example 15 was treated with a 1% aqueous solution of potassium hydroxide at 30° C. for 8 minutes to produce a regenerated cellulose hollow fiber. The regenerated hollow fiber was well-shaped and had a true-circular cross-section.

REFERENCE EXAMPLE 2

The dialysis properties of the cellulose hollow fibers manufactured in Examples 16 and 17 were measured. In addition, the hollow fibers produced in Examples 10, 11, 12 and 14 were hydrolyzed in a 1% sodium hydroxide aqueous solution. The dialysis properties of regenerated hollow fibers were also measured. Cylindrical dialyzers of an artificial kidney type were assembled by using the above cellulose or regenerated cellulose hollow fibers in such a way that respective total effective membranes area were 1.0 m². A solution of urea dissolved in distilled water (100 mg/dl) was led through the interior of the hollow fiber of each dialyzer at a rate of 200 ml/min. Distilled water was perfused along the exterior of the hollow fiber at a rate of 500 ml/min counter-currently, the dialysances of urea and vitamin $B_{12}$ and the ultrafiltration rate (UFR) at 37° C. were measured. The results obtained are shown in Table II.

TABLE II

| Hollow fiber of regenerated cellulose | Dialysance (ml/min) | | UFR (ml/m² · hr · mmHg) |
| --- | --- | --- | --- |
| | Urea | Vitamin B$_{12}$ | |
| Obtained from | | | |
| Example 10 | 168 | 42 | 3.8 |
| Example 11 | 162 | 45 | 4.0 |
| Example 12 | 165 | 40 | 4.4 |
| Example 14 | 169 | 48 | 5.6 |
| Obtained in | | | |
| Example 16 | 163 | 52 | 4.9 |
| Example 17 | 161 | 56 | 5.2 |

As understood from these data, the hollow fibers of the present invention are excellently useful for the blood dialysis.

While there has been described preferred embodiments of the present invention, obviously further modifications and variations are possible in light of the above teachings. It is therefore to be understood that the present invention may be practised otherwise than as specifically described, within the scope of the apended claims.

What is claimed is:

1. In a method of manufacturing a hollow fiber characterized in that a spinning solution consisting essentially of cellulose ester dissolved in an organic solvent is extruded from an annular slit of an orifice while simultaneously introducing a core liquid into the inside hollow portion of the extruded spinning solution, the improvement comprising: (a) using a monoterpene or a solution of the monoterpene as core liquid; and (b) incorporating into the spinning solution a component which renders the monoterpene or the solution of the monoterpene nonmiscible with the spinning solution and develops phase separation therebetween.

2. The method according to claim 1 in which more than 20 percent by weight of said core liquid is monoterpene and less than 80 percent by weight of said core liquid is water.

3. The method according to claim 1 in which said monoterpene is an acyclic monoterpene selected from the group consisting of $\beta$-myrcene, ocimene and cryptotaenene, a monocyclic monoterpene such as limonene, d-limonene, l-limonene, dipentene, isolimonene, terpinolene, $\alpha$-terpinene, $\gamma$-terpinene, $\beta$-terpinene, l-$\alpha$-phellandrene, d-$\alpha$-phellandrene, dl-$\alpha$-phellandrene, $\beta$-phellandrene, 2,8(9)-p-menthadiene, d-sylvestrene, l-sylvestrene and dl-sylvestrene, or a bicyclic monoterpene selected from the group consisting of $\Delta^3$-carene, d-$\Delta^3$-carene, l-$\Delta^3$-carene, d-sabinene, l-sabinene, $\alpha$-thujene, $\beta$-thujene, l-$\beta$-pinene, l-$\alpha$-fenchene, d-$\beta$-fenchene, $\alpha$-fenchene, cyclofenchene, orthodene, carane and trans-l-pinane.

4. The method according to claim 1, in which said spinning solution is extruded downward from said annular slit substantially in the perpendicular direction, and the extruded spinning solution is run through a gaseous space of at least 5 cm in length and then introduced into a coagulating bath.

5. The method according to claim 4, in which after the coagulation in said coagulating bath a coagulated filament of said spinning solution involving said core liquid in its hollow portion is subjected successively to washing, hydrolyzing to regenerate cellulose, neutralization and plasticizing.

6. The method according to claim 1 in which said organic solvent in said spinning solution consists essentially of acetone.

7. The method according to claim 1, in which said organic solvent in said spinning solution consist of acetone and formamide.

8. The method according to claim 7, in which said monoterpene is used as core liquid.

9. The method according to claim 8 in which said monoterpene is at least one member selected from the group consisting of d-limonene, l-limonene, dl-limonene, orange oil, and lemon oil.

* * * * *